United States Patent [19]

Matsushima et al.

[11] 4,283,512
[45] Aug. 11, 1981

[54] COPOLYMER HAVING PEROXY BONDS IN THE MOLECULE THEREOF AND A PROCESS FOR PRODUCING THE SAME

[75] Inventors: Masaru Matsushima, Aichi, Japan; Takeshi Komai, Lawrence, Kans.; Masaharu Nakayama, Nagoya, Japan

[73] Assignee: Nippon Oil and Fats Co., Ltd., Tokyo, Japan

[21] Appl. No.: 97,627

[22] Filed: Nov. 27, 1979

[30] Foreign Application Priority Data

Nov. 30, 1978 [JP] Japan ............................. 53/148436

[51] Int. Cl.$^3$ ........................................... C08F 283/02
[52] U.S. Cl. ................................... 525/438; 525/445; 528/176; 528/191; 528/192; 528/271; 528/272; 528/289; 528/297; 528/299; 528/300; 528/301; 528/303; 528/306; 528/322; 528/323; 528/362; 528/363

[58] Field of Search ............... 525/438, 445; 528/176, 528/191, 192, 271, 272, 289, 299, 300, 301, 303, 306, 322, 362, 363, 297, 323

[56] References Cited

U.S. PATENT DOCUMENTS 3,592,948  7/1971  Bafford et al. ...................... 528/271

Primary Examiner—J. Ziegler
Attorney, Agent, or Firm—Blanchard, Flynn, Thiel, Boutell & Tanis

[57] ABSTRACT

A copolymer having peroxy bonds in the molecule thereof which is obtained by copolymerizing an diacyl type polymeric peroxide having ester bonds therein with one or more monomers having double bonds therein, may have a broad range of average molecular weight and a lot of peroxy bonds therein, and it may be used as an useful polymerization initiator in producing a block copolymer.

6 Claims, No Drawings

COPOLYMER HAVING PEROXY BONDS IN THE MOLECULE THEREOF AND A PROCESS FOR PRODUCING THE SAME

BACKGROUND OF THE INVENTION FIELD OF THE INVENTION

This invention relates to a copolymer having peroxy bonds in the molecule thereof. More particularly the present invention relates to a novel copolymer having peroxy bonds in the molecule thereof, a use thereof and a process for producing the same. A copolymer having peroxy bonds in the molecule thereof is very useful as a polymerization initiator, because monomers having double bonds therein other than those which are used to produce said copolymer are subjected to a polymerization using the same as a polymerization initiator, whereby a blocked copolymer can be obtained easily.

A method for producing a copolymer having peroxy bonds in the molecule thereof which comprises polymerizing monomers having double bonds therein with diacyl type polymeric peroxides not having ester bonds therein has heretofore been known.

There are several reports concerning this method.

For example, Sugimura et al. reported in Journal of the Chemical Society of Japan, Industrial Chemistry Section 69 718 (1966) and A. E. Woodward et al. reported in J. Polymer Sci. 14 126 (1954) and ibid. 17 51 (1955) that styrenes were polymerized using a polyphthaloyl peroxide, thereby obtaining polystyrenes having peroxy bonds in the molecule thereof.

Further, N.S. Tsvetkov et al. reported in Chem. abst. 62 5,337$^c$ (1965), ibid. 62 13,238$^f$ (1965), ibid. 70, 29,399$^t$ (1969) and Eur. Polym. J. (suppl.) 1969, 489–493 etc. that styrene or methyl methacrylate was subjected to a polymerization using a diacyl type polymeric peroxide

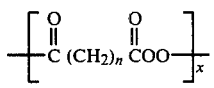

(wherein n is 2–10 and x is 16–35) having polymethylene bonds therein, thereby obtaining a polystyrene or polymethyl methacrylate having peroxy bonds in the molecule thereof.

However, the conventional polymers having peroxy bonds in the molecule thereof, such as those described in the foregoing have disadvantages in that (1) As the solubility of the polyphthaloyl peroxide or the diacyl type polymeric peroxide having polymethylene bonds therein, which have no ester bonds therein, such as those described hereinbefore, in a monomer having double bonds therein or an organic solvent is very small, they can be charged into the monomers only in a ratio of 0.5–1 part by weight based on 100 parts by weight of the monomer, in the polymerization procedure, (2) and that owing to the disadvantage (1) described in the foregoing, it is required for obtaining the polymers with good yield, to lengthen the polymerization time, or to increase the polymerization temperature, with the result being that the peroxy bonds which were introduced into the molecule of the polymer are cleaved by the heat.

Accordingly, the obtained polymer has a very small number of peroxy bonds per unit average molecular weight, e.g. in case the polymer is a polystyrene having peroxy bonds in the molecule thereof, the number of the peroxy bonds is at most 1–2 per 100,000 of the average molecular weight.

Further, the copolymer having peroxy bonds in the molecule thereof is reported to be a kind of a block copolymer which comprises a polymer block which was formed by polymerization of monomers having double bonds therein and a peroxide block.

Also, in this case, since, owing to the disadvantage (1) the conventional diacyl type polymeric peroxide and the polyphaloyl peroxide can be charged into the monomer only in a small and narrow range of ratio of the same to the monomer, the average molecular weight of the obtained block copolymer having peroxy bonds in the molecule thereof was necessarily limited narrowly.

Accordingly, when the conventional copolymers having peroxy bonds in the molecule thereof are used as a polymerization initiator in producing a block copolymer by polymerizing monomers having double bonds therein, other than those which were used to produce said polymerization initiator, they were so weak in activity as a polymerization initiator that almost no industrial value was recognized for them.

SUMMARY OF THE INVENTION

It is an object of the present invention to provide new copolymers.

It is another object of the present invention to provide copolymers which exhibit enough activity for producing block copolymers and which have so many peroxy bonds in the molecule thereof as to be of industrial worth.

It is still another object of the present invention to provide copolymers whose molecular design may be varied in a broad range of the average molecular weight and the number of peroxy bonds in the molecule thereof.

A copolymer having peroxy bonds in the molecule thereof of the present invention can be obtained by copolymerizing a diacyl type polymeric peroxide having ester bonds therein which have the following formula (1), with one or more monomers having the following formula (2)

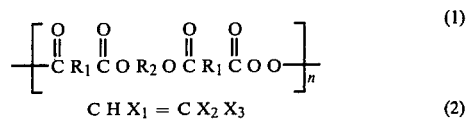  (1)

$$CHX_1 = CX_2X_3 \quad (2)$$

$$CHX_1 = CX_2X_3 \quad (2)$$

Wherein $R_1$ is an alkylene group of 1–15 carbon atoms or a phenylene group, $R_2$ is an alkylene group of 2–10 carbon atoms, —(CHR$_3$'CH$_2$O)lCHR$_3$'CH$_2$,

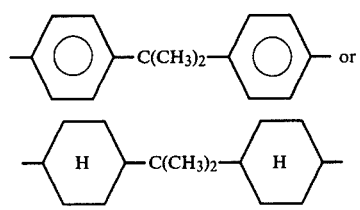 or wherein $R_3'$ is a hydrogen atom or a methyl group, l is 1–10, and n is 2–10, $X_1$ is a radical selected from the group consisting of a hydrogen atom,

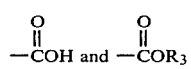

$X_2$ is a radical selected from the group consisting of a hydrogen atom, $-CH_3$, $-Cl$ and $-CN$, $X_3$ is a radical selected from a group consisting of $-Cl$, $-CN$,

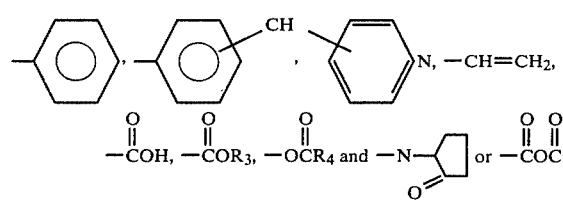

(where $X_1$ and $X_2$ is combined to one), wherein $R_3$ and $R_4$ is an alkyl group or a substituted alkyl group of 1–18 carbon atoms, when both $X_1$ and $X_2$ is a hydrogen atom, $X_3$ is $-Cl$, $-CN$,

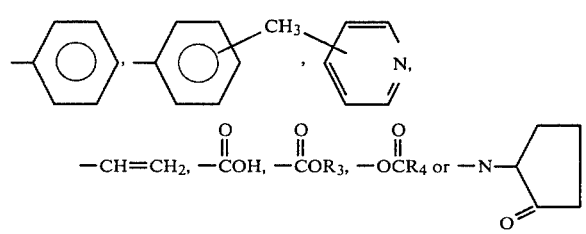

when $X_1$ is a hydrogen atom and $X_2$ is $-CH_3$, $X_3$ is

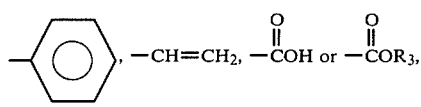

When $X_1$ is a hydrogen atom and $X_2$ is $-Cl$ or $-CN$, $X_3$ is $-Cl$, $-CN$ or $-CH=CH_2$
when $X_1$ is

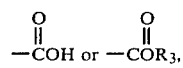

$X_2$ is a hydrogen atom and $X_3$ is

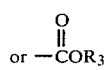

and
when $X_2$ is a hydrogen atom, $X_1$ and $X_3$ is combined in one to be

The copolymer having peroxy bonds in the molecule thereof of the present invention has units of

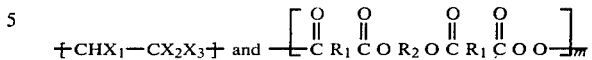

(wherein $X_1$, $X_2$, $X_3$, $R_1$ and $R_2$ are the same as described in the foregoing, m is $1 \leq m \leq n-1$).

The copolymer having peroxy bonds in the molecule thereof is generally 5,000–1,000,000 in the average molecular weight thereof and it has 1 to 100 more of peroxy bonds per the average molecular weight, compared to conventional copolymer having peroxy bonds therein. It has the characteristics that it has a broad range of average molecular weight and numbers of peroxy bonds.

The diacyl type polymeric peroxide having ester bonds therein used in the present invention may be produced by a known method for producing a carboxylic ester and a diacyl type peroxide.

There is mentioned one example which comprises subjecting a dibasic acidic chloride (1) with a glycol to a dehydrochlorination in a current of dry air or dry nitrogen according to the following reaction formula, whereby an acid chloride having ester bonds therein (III) is obtained and reacting the obtained product (III) with a sodium peroxide aqueous solution by adding the product (III) into the sodium peroxide aqueous solution little by little.

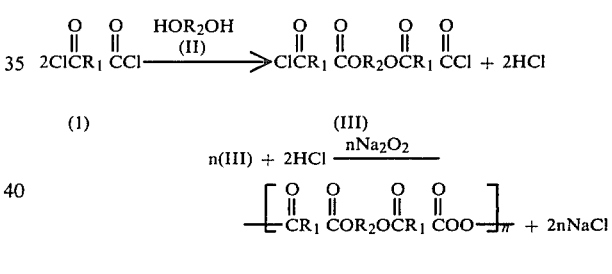

Wherein $R_1$ and $R_2$ are the same groups as those described in Formula (1) and n is 2–20.

Representative diacyl type polymeric peroxides having ester bonds therein, for example, may be mentioned as follows.

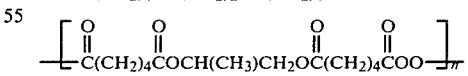

-continued $$-\left[-\overset{O}{\overset{\|}{C}}(CH_2)_4\overset{O}{\overset{\|}{C}}O(CH_2CH_2O)_{10}\overset{O}{\overset{\|}{C}}(CH_2)_4\overset{O}{\overset{\|}{C}}OO-\right]_{n}$$

$$-\left[-\overset{O}{\overset{\|}{C}}(CH_2)_4\overset{O}{\overset{\|}{C}}O-(\overset{CH_3}{\overset{|}{CH}}CH_2O)_{10}\overset{O}{\overset{\|}{C}}(CH_2)_4\overset{O}{\overset{\|}{C}}OO-\right]_{n}$$

$$-\left[-\overset{O}{\overset{\|}{C}}(CH_2)_{10}\overset{O}{\overset{\|}{C}}O(CH_2)_2O\overset{O}{\overset{\|}{C}}(CH_2)_{10}\overset{O}{\overset{\|}{C}}OO-\right]_{n}$$

$$-\left[-\overset{O}{\overset{\|}{C}}(CH_2)_{10}\overset{O}{\overset{\|}{C}}O(CH_2)_2O(CH_2)_2O\overset{O}{\overset{\|}{C}}(CH_2)_{10}\overset{O}{\overset{\|}{C}}OO-\right]_{n}$$

$$-\left[-\overset{O}{\overset{\|}{C}}(CH_2)_{10}\overset{O}{\overset{\|}{C}}O(CH_2)_2O(CH_2)_2O(CH_2)_2O\overset{O}{\overset{\|}{C}}(CH_2)_{10}\overset{O}{\overset{\|}{C}}OO-\right]_{n}$$

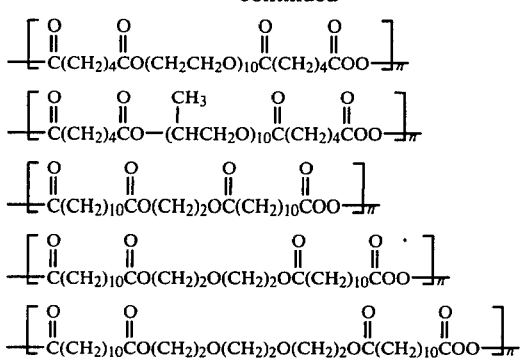

(n ≈ 2-20)

These diacyl type polymeric peroxides having ester bonds therein are much higher in their solubility in monomers having double bonds therein or organic solvents, as shown in Table 1, than the conventional diacyl type polymeric peroxides having no ester bonds or the polyphthaloyl peroxide, with the result being that they may be used at a high concentration in relation to the monomers in the polymerization procedure and the polymerization time may be shortened by a large margin.

Accordingly, in the copolymers having peroxy bonds in the molecule thereof of the present invention, far more peroxy bonds are introduced per unit average molecular weight, than in the conventional ones.

Since the diacyl type polymeric peroxides having ester bonds therein may be used in a broad range of from a low concentration to high concentration in relation to the monomers in the polymerization procedures, the copolymers having peroxide bonds in the molecule thereof of the present invention can be made to vary widely in the number of the peroxy bonds and the average molecular weight thereof.

Accordingly, a block copolymer can be produced with high efficiency by using the vigorously active copolymers having peroxy bonds in the molecule thereof and the molecular design for the obtained blocked polymer can be varied in a broad range

TABLE 1

| | | Solubility (25° C., g/100g solvent) | | | |
| | | Organic Solvent | | | |
| Peroxide | | Benzene | Toluene | Stryene | Vinyl-acetate |
|---|---|---|---|---|---|
| Conventional peroxide | $\left[-\overset{O}{\overset{\|}{C}}(CH_2)_{10}\overset{O}{\overset{\|}{C}}OO-\right]_n$ | 1.9 | 1.0 | 0.5 | 0.5 |
| | $\left[-\overset{O}{\overset{\|}{C}}-\bigcirc-COO-\right]_n$ | 1.8 | 0.9 | 0.5 | 0.4 |
| Peroxide of the present invention | $\left[-\overset{O}{\overset{\|}{C}}(CH_2)_4\overset{O}{\overset{\|}{C}}O(CH_2)_4O\overset{O}{\overset{\|}{C}}(CH_2)_4\overset{O}{\overset{\|}{C}}OO-\right]_n$ | 14.8 | 5.4 | 5.7 | 5.3 |
| | $\left[-\overset{O}{\overset{\|}{C}}(CH_2)_4\overset{O}{\overset{\|}{C}}O(CH_2)_2O(CH_2)_2O(CH_2)_2-O\overset{O}{\overset{\|}{C}}(CH_2)_4\overset{O}{\overset{\|}{C}}OO-\right]_n$ | 21.5 | 7.1 | 8.2 | 8.1 |
| | $\left[-\overset{O}{\overset{\|}{C}}(CH_2)_{10}\overset{O}{\overset{\|}{C}}O(CH_2)_2O(CH_2)_2O\overset{O}{\overset{\|}{C}}-(CH_2)_{10}\overset{O}{\overset{\|}{C}}OO-\right]_n$ | 24.1 | 11.0 | 9.8 | 9.5 |

As typical monomers having double bonds therein used in the present invention as shown in the aforesaid general formula (2), there are mentioned the following;

For example, styrene, vinyl chloride, vinylidene chloride, acrylonitrile, vinylidene cyanide, vinyl acetate, vinyl butyrate, vinyl stearate, vinyl toluene, vinyl pyridine, vinyl pyrrolidone, acrylic acid, methacrylic acid, methyl acrylate, ethyl acrylate, butyl acrylate, 2-ethylhexyl acrylate, lauryl acrylate, stearyl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hydroxypropyl methacrylate, glycidil methacrylate, acids and their esters such as maleic anhydride, maleic acid, maleic ester, fumaric acid, fumaric ester and the like and conjugated dienes such as butadiene, isoprene, chloroisoprene and the like are mentioned.

The said monomers having double bonds therein are used alone or in a mixture of two or more kinds of monomers which are copolymerizable with each other.

The copolymers having peroxide bonds in the molecule thereof can be easily obtained by copolymerizing one or more diacyl type polymeric peroxides having ester bonds therein as shown in the forementioned general formula (1), with one or more monomers having double bonds therein as shown in the aforementioned general formula (2), according to a known process of bulk polymerization, suspension polymerization, or solution polymerization.

The amount used of the diacyl type polymeric peroxide having ester bonds therein is preferably 0.5–10 parts by weight in relation to 100 parts by weight of the said monomer having double bonds therein or a mixture or two more of said monomers.

The polymerization temperature is preferably 50°–90° C. and the polymerization time is preferably 2–8 hours.

The copolymer having peroxy bonds therein of the present invention can be identified as having the peroxy bonds in the molecule by a process which comprises dissolving the resultant product which is obtained by the polymerization reaction into a good solvent, pouring the obtained solution into a poor solvent thereby depositing the copolymer, filtering off the deposited copolymer, drying the deposited polymer at a reduced pressure thereby separating the unpolymerized monomers and the unreacted polymeric peroxide therefrom, and analyzing the said copolymer by infrared spectroscopy.

Namely, the presence of $-[CHX_1-CX_2 X_3]$, one unit of the said copolymer, and that of

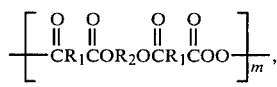

the other unit of the said copolymer, can be proved by showing the characteristic absorption bands of $-[CHX-CX_2 X_3]$ and

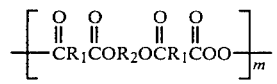

in the infrared spectrum of the said copolymer.

The characteristic absorption band of

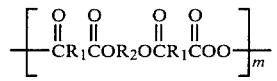

is recognized in the range of 1818–1754 cm$^{-1}$.

The number of peroxy bonds which are introduced into the molecule of the copolymer of the present invention can be obtained by measuring the average molecular weight thereof and the amount of the active oxygen according to the conventional method.

The presence of the peroxy bonds in the molecule of the present invention can be proved according to the following process.

The process comprises dissolving the copolymer of the present invention into a suitable quantity of a good solvent, heating the resulting solution at 60° C. for several hours while adding an excess of methanol solution of sodium methoxide with stirring, thereby subjecting the peroxy bonds of the copolymer to an alkaline cleavage reaction the, pouring the resulting reaction solution into a large quantity of a poor solvent thereby depositing the cleaved copolymer, filtering off the obtained cleaved copolymer, followed by drying it at a reduced pressure and measuring its average molecular weight and its amount of the active oxygen and analyzing it by infrared spectroscopy.

It can be proved by confirming the disappearance of the absorption bands of the diacyl carbonyl group at the range of 1818–1754 cm$^{-1}$ in the infrared spectrum of the cleaved copolymer, the remarkable decline of the average molecular weight thereof, the diminution of the amount of the active oxygen thereof and the conversion of the high molecular weight copolymer to the low molecular weight copolymer by the cleavage reaction to the peroxy bonds of the said copolymer of the present invention, that the copolymer of the present invention has peroxy bonds in the molecule thereof.

PREFERRED EMBODIMENTS OF THE INVENTION

The present invention is further illustrated by the following non-limitative examples, comparative examples and reference examples.

The term "part" shall mean parts by weight hereinafter.

EXAMPLE 1

[Preparation of polystyrene having peroxy bonds in the molecule thereof]

(1) bulk polymerization

Into a glass ampule (inside diameter is 20 mm and its volumetric capacity is 50 ml) was charged a solution of 1.2 parts of

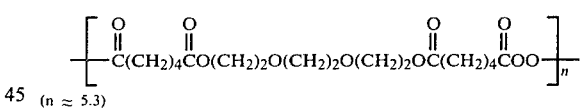

(n ≈ 5.3)

dissolved into 15 parts of styrene monomer, and the air in the ampule was replaced with nitrogen gas followed by sealing the ampule at the upper part thereof by melting.

The contents of the ampule were subjected to polymerization for 3 hours by immersing the ampule in a oil bath which was kept at 75° C.

The resulting solid polymer was dissolved in 100 ml of benzene so as to separate the unpolymerized monomers and the unreacted polymeric peroxide therefrom and the obtained solution was poured into a large quantity of methanol, thereby depositing the polystyrene having peroxy bonds in the molecule thereof.

The obtained product was filtered off and was dried at a reduced pressure, whereby 14 parts of polystyrene having peroxy bonds in the molecule thereof, a white solid powder, were obtained.

As for this polystyrene, according to the viscosity method the average molecular weight thereof was measured to be about 50,000. The number of the peroxy bonds which were introduced into the molecule of the said polystyrene, was measured by the Iodometry to be about 3.0 units (mean value).

The product was analyzed by infrared spectroscopy using 15% chloroform solution thereof. On analysis, it was found that the product has the characteristic absorption showing the presence of carbonyl band of the diacyl peroxy group of the polymeric peroxide at 1805 cm$^{-1}$ and 1780 cm$^{-1}$, and the characteristic absorption of polystyrene.

A solution was obtained by dissolving 1.5 grams of the product into 50 ml of benzene and the solution was mixed with a solution consisting of 2 grams of sodium methoxide and 8 grams of methanol.

The resulting solution was subjected to an alkaline cleavage reaction of peroxy bonds of the copolymer at 62° C. for 2 hours with stirring. The resulting reaction solution was poured into a large quantity of methanol. The obtained cleaved copolymer was filtered off and dried at a reduced pressure, thereby obtaining 1.3 grams of polystyrene, a white powder.

As for the polystyrene which was obtained by the alkaline cleavage reaction, the average molecular weight thereof was measured according to the viscosity method to be about 23,000.

The said polystyrene was analyzed by infrared spectroscopy, using 15% chloroform solution thereof.

On analysis, it was found that the absorption bands showing the presence of the carbonyl bands at 1805 cm$^{-1}$ and 1780 cm$^{-1}$ were diminished. Also, iodine was not recognized from the results of the Iodometry.

From these results, it was recognized that in the obtained polystyrene, the peroxy bands were introduced into the molecule thereof.

(2) Suspension Polymerization

In a glass reactor which was equipped with a thermometer, a stirrer and a reflux condenser, there were charged 250 parts of 0.7% aqueous solution of polyvinyl alcohol, followed by charging a solution of 8 parts of

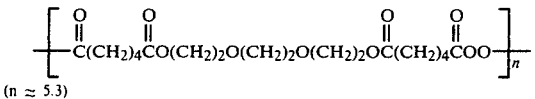

(n ≈ 5.3)

was dissolved into 100 parts of styrene monomers.

While the air in the reactor was replaced with nitrogen gas, the batch was subjected to polymerization at 75° C. for 3 hours with stirring.

The obtained polymers were filtered off and washed with water, followed by dissolving the same in benzene. The resulting solution was poured into a large quantity of methanol, thereby depositing polymers. The resulting polymers were filtered off and dried at a reduced pressure, thereby obtaining 99 parts of a polystyrene having peroxy bonds in the molecule thereof.

Similar to the procedure of the preceding measurement, the average molecular weight of the said polymer was measured to be 49,000 and the number of the peroxy bonds in the molecule of the said polymer was also measured to be 2.8 units (mean value).

The results of the infrared absorption spectra thereof which were obtained according to the procedures of the preceding infrared absorption analysis, showed that the said polymer has the characteristic absorption showing the presence of carbonyl bands of the diacyl peroxy group of the polymeric peroxide at 1805 cm$^{-1}$ and 1780 cm$^{-1}$ and the characteristic absorption of polystyrene. According to the same procedure as that described in the foregoing, the said polymer was subjected to an alkaline cleavage reaction and the resulting polymer was measured for the following properties, thereby obtaining the following results.

The average molecular weight: about 21,000

The infrared spectrum: the carbonyl bands at 1805 cm$^{-1}$ and 1780 cm$^{-1}$ were diminished.

Iodometry: isolation of iodine was not recognized.

From these results, it was recognized that there were introduced peroxy bonds in the molecule of the obtained polystyrene.

(3) Solution polymerization

In a glass reactor which was equipped with a thermometer, a stirrer and a reflux condenser, there were charged a solution containing 25 parts of styrene, 2 parts of

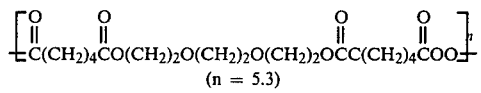

(n = 5.3)

and 25 parts of benzene.

The batch was subjected to polymerization at 75° C. for 3 hours with stirring while replacing the air in the reactor with nitrogen gas.

The resulting polymerization solution was poured into a large quantity of methanol, thereby depositing the polymer.

The obtained polymers were filtered off and dried at a reduced pressure whereby 20 parts of polystyrene having peroxy bonds in the molecule thereof were obtained.

As for the polystyrene, the following properties thereof were measured according to the same procedures as that described in the foregoing and the obtained results were as follows.

Average molecular weight: about 45,000

Number of the peroxy bonds in the molecule thereof: 2.5 (Mean value)

Infrared absorption spectrum: the characteristic absorption showing the presence of carbonyl bands of the diacyl peroxy group of the polymeric peroxide at 1805 cm$^{-1}$ and 1780 cm$^{-1}$ and the characteristic absorption of the polystyrene were recognized.

The said polystyrene was subjected to an alkaline cleavage reaction according to the same procedure as that described in the forgoing, and the obtained product was measured for the following properties. The results are as follows.

The average molecular weight: about 23,000

The infrared absorption spectrum: the carbonyl bands at 1805 cm$^{-1}$ and 1780 cm$^{-1}$ were diminished Iodometry: isolation of iodine was not recognized From these results, it was recognized that there were introduced peroxy bonds in the molecule of the obtained polystyrene.

Comparative Example 1.

[Preparation of a polystyrene having peroxy bonds in the molecule thereof]

In the same ampule as used in Example 1, (1), there were charged a solution of 0.075 part of a polysebacoyl peroxide dissolved into 15 parts of styrene monomer.

The batch was subjected to polymerization at 75° C. for 3 hours according to the same procedures as described in Example 1 (1).

The obtained viscous liquid of polymer was processed according to the same procedures as described in Example 1 (1), whereby 6.5 parts of polystyrene having peroxy bonds in the molecule thereof, a white powder, were obtained.

The average molecular weight of the obtained product was 195,000 and number of peroxy bonds therein was 1.4 units.

It was found from the infrared absorption analysis thereof that the product has the characteristic absorption showing the presence of carbonyl bands of the diacyl peroxy group of the polymeric peroxide at 1805 cm$^{-1}$ and 1780 cm$^{-1}$ and the characteristic absorption of the polystyrene. The said product was subjected to an alkaline cleavage reaction.

The obtained cleaved polymer was measured about the following properties and the results are as follows;
Average molecular weight: 140,000
Infrared absorption spectrum: the carbonyl bands at 1805 cm$^{-1}$ and 1780 cm$^{-1}$ were diminished
Iodometry: isolation of iodine was not recognized From these results, it was found that peroxy bonds were introduced into the molecule of the obtained polystyrene but the number of peroxy bonds in the molecule thereof was far smaller than that of the polystyrene having peroxy bonds in the molecule thereof of the present invention, because polysebacoyl peroxide is small in its solubility in a styrene monomer and a sufficient polymerization conversion ratio cannot be obtained thereby.

EXAMPLE 2-7

]Preparation of polystyrene having peroxy bonds in the molecule thereof]

The same procedures as described in Example 1 (2) were carried out except that the respective peroxides as shown in Table 2 were used in place of

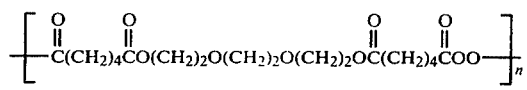

under the polymerization conditions as shown in Table 2, whereby respective polystyrenes having peroxy bonds in the molecule thereof, white powders were obtained.

TABLE 2

Polymeric peroxide used and polymerization conditions

| Polymeric peroxide Kind | | Amount used (part) | Polymerization temperature (°C.) | Polymerization hour (hrs) |
|---|---|---|---|---|
| Example 2 | $+C(CH_2)_4CO(CH_2)_2OC(CH_2)_4COO+_{\overline{n}}$ (n = 5.5) with O‖ O‖ O‖ O‖ groups | 4 | 75 | 4 |
| Example 3 | $+C(CH_2)_4COCH(CH_3)CH_2OC(CH_2)_4COO+_{\overline{n}}$ (n = 4.4) | 5 | 75 | 3 |
| Example 4 | $+C(CH_2)_4CO(CH_2)_4OC(CH_2)_4COO+_{\overline{n}}$ (n = 5.5) | 4 | 75 | 4 |
| Example 5 | $+C(CH_2)_4CO(CHCH_3CH_2O)_{10}C(CH_2)_4COO+_{\overline{n}}$ (n = 3.2) | 10 | 75 | 3 |
| Example 6 | $+C(CH_2)_{10}CO(CH_2)_2O(CH_2)_2OC(CH_2)_{10}COO+_{\overline{n}}$ (n = 2.8) | 8 | 75 | 3 |
| Example 7 | $+C-\langle O \rangle-OC-\langle H \rangle-C(CH_3)_2-\langle H \rangle-OC-\langle O \rangle-COO+_{\overline{n}}$ (n = 3.6) | 4 | 80 | 3 |

Concerning the respectively obtained polystyrenes, the average molecular weight thereof was measured according to the viscosity method, and the amount of the active oxygen was measured by Iodometry to obtain the number of peroxy bonds (mean value). From the results of analysis of the respectively obtained polystyrenes by infrared spectroscopy, the characteristic absorption of the polystyrene and the characteristic absorption showing the presence of carbonyl bands at 1818 - 1754 cm$^{-1}$ were confirmed in the respective infrared spectra. The obtained results are shown in Table 3.

The respectively cleaved polystyrenes obtained according to the same procedures as described in Example (1) were measured about the following properties.
Average molecular weight; results are shown in Table 3
Infrared absorption spectrum; The two carbonyl bands at 1818 cm$^{-1}$ and 1754 cm$^{-1}$ were diminished
Iodometry; Isolation of iodine was not recognized It was recognized from these results that there were introduced peroxy bonds in the molecule of the respective polystyrenes.

EXAMPLE 8

+[Preparation of a polyvinyl acetate having peroxy bonds in the molecule thereof]+

(1) Suspension polymerization

TABLE 3

| | Polystyrene having peroxy bonds in the molecule thereof | | | | |
|---|---|---|---|---|---|
| | Yield (part) | Average molecular weight ($10^4$) | Number of peroxy bonds introduced in the molecule | Maximum absorption of carbonyl bands owing to diacyl peroxy group | Average molecular weight of the cleaved polystyrene($10^4$) |
| Example 2 | 95 | 5.2 | 2.7 | 1805 1780 | 2.7 |
| Example 3 | 98 | 5.1 | 3.3 | 1805 1780 | 2.5 |
| Example 4 | 94 | 4.8 | 2.5 | 1805 1780 | 2.4 |
| Example 5 | 98 | 4.6 | 2.5 | 1805 1780 | 1.5 |
| Example 6 | 97 | 4.9 | 3.2 | 1800 1775 | 2.0 |
| Example 7 | 100 | 4.5 | 2.8 | 1790 1770 | 1.9 |

Into a glass reactor which was equipped with a thermometer, a stirrer, and a reflux condenser, there were charged 300 parts of 2% aqueous solution of polyvinyl alcohol, followed by charging a solution of 5 parts of

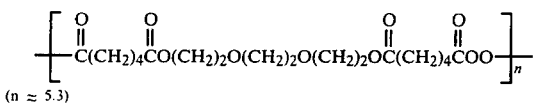
(n ≃ 5.3)

dissolved into 100 parts of vinyl acetate monomer.

The batch was subjected to a polymerization at 60° C. for 3 hours with stirring while replacing the air in the reactor with nitrogen gas.

The resulting polymers were filtered off and washed with water, followed by dissolving the same into benzene. The obtained solution was poured into a large quantity of petroleum ether, thereby depositing a polymer. The said polymer was filtered off and dried at a reduced pressure, whereby 97 parts of polyvinyl acetate having peroxy bonds in the molecule thereof, a white powder, were obtained.

As for the said polyvinyl acetate, the average molecular weight thereof was measured to be about 330,000 according to the viscosity method and the number of peroxy bonds in the molecule thereof was 32.7 by Iodometry.

It was found from the infrared absorption analysis thereof that the said product has the characteristic absorption showing the presence of carbonyl bands of the diacyl peroxy groups of polymeric peroxide at 1805 cm$^{-1}$ and 1780 cm$^{-1}$, and the characteristic absorption of the polyvinyl acetate.

According to the same procedures as described in Example 1 except that a petroleum ether was used as the precipitation agent, the said polymer was subjected to an alkaline cleavage reaction, whereby the resulting polymer was obtained and further it was measured about the following properties thereof. The results are as follows.

Average molecular weight: about 52,000
Iodometry: isolation of iodine was not recognized.
Infrared absorption spectrum: the carbonyl bands at 1805 cm$^{-1}$ were diminished From these results, it was recognized that there were introduced peroxy bonds in the molecule of the obtained polyvinyl acetate.

(2) Solution Polymerization

In the same reactor as used in Example 1 (3) were placed 25 parts of vinyl acetate and a solution consisting of 2.5 parts of

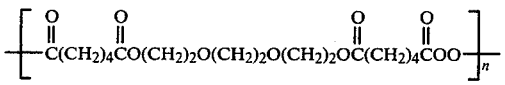
(n ≃ 5.3)

and 25 parts of benzene.

The batch was subjected to a polymerization at 60° C. for one hour with stirring while replacing the air in the reactor with nitrogen gas. The resulting polymerization liquid was poured into a large quantity of petroleum ether, thereby depositing the polymers.

The obtained polymers were filtered off and dried at a reduced pressure, whereby 20 parts of polyvinyl acetate having peroxy bonds in the molecule thereof were obtained.

As for the said polyvinyl acetate, its average molecular weight was measured according to the viscosity method to be about 180,000. The number of peroxy bonds in the said polyvinyl acetate was 91 units (mean value).

It was found from the infrared absorption analyses thereof that the said product has the characteristic absorption showing the presence of carbonyl bands of the diacyl peroxy groups of polymeric peroxide at 1805 cm$^{-1}$ and 1780 cm$^{-1}$, and the characteristic absorption of the polyvinyl acetate.

According to the same procedures as that described in Example 1 (1) except that a petroleum ether was used as a precipitation agent, the said polyvinyl acetate was subjected to an alkaline cleavage reaction, thereby obtaining polymer and the obtained polymer was measured about the following properties thereof. The average molecular weight thereof was about 38,000 and from the Iodometory therefor, isolation of iodine therefrom was not observed. It was found from the infrared absorption analysis that the carbonyl bands at 1805 cm$^{-1}$ and 1780 cm$^{-1}$ were diminished.

It was recognized from these results that peroxy bonds were introduced into the molecule of the obtained polyvinyl acetate.

Comparative Example 2

[Preparation of a polyvinyl acetate having peroxy bonds in the molecule thereof]

According to the same procedure as that described in Example 8 (1), there were charged 300 parts of aqueous solution of 2% polyvinyl alcohol, followed by charging a solution consisting of 100 parts of vinyl acetate monomer and 0.5 part of poly sebacoyl peroxide into the reactor.

The batch was subjected to a polymerization at 60° C. for 8 hours with stirring while replacing the air in the reactor with nitrogen gas.

The obtained polymers were filtered off, and were washed with water, followed by dissolving the same in benzene. The obtained solution was poured into a large quantity of petroteum ether, thereby depositing the polymers. The said polymers were filtered off and dried at a reduced pressure, thereby obtaining 90 parts of polyvinyl acetate having peroxy bonds in the molecule thereof.

The number average molecular weight of the said polyvinyl acetate was about 520,000 and the number of peroxy bonds in the molecule thereof was 6.3 units (mean value).

It was found from the infrared absorption analysis that the said polyvinyl acetate has the characteristic absorption showing the presence of carbonyl bonds of the diacyl peroxy groups of polymeric peroxide at 1800 cm$^{-1}$ and 1775 cm$^{-1}$ and the characteristic absorption of the polyvinyl acetate.

As for polyvinyl acetate which was obtained by subjecting said polyvinyl acetate to an alkaline cleavage reaction according to the same procedures as that described in Example 1 (1) except that a petroleum ether was used as a precipitating agent, the average molecular weight thereof was about 200,000 and isolation of iodine was not recognized in the Iodometry therefor.

It was found from the infrared absorption analysis that the carbonyl bands at 1800 cm$^{-1}$ and 1775 cm$^{-1}$ were diminished.

It was recognized from these results that peroxy bonds were introduced into the molecule of the obtained polyvinyl acetate but the polyvinyl acetate of Comparative Example 2 was far smaller than that of the corresponding Example of the present invention in the number of peroxy bonds per unit average molecular weight because polysebacoyl peroxide is small in the solubility thereof in a vinyl acetate monomer.

EXAMPLE 9

[Preparation of polyvinyl chloride having peroxy bonds in the molecule thereof]

In a stainless autoclave, there were charged 120 parts of 0.2% aqueous solution of polyvinyl alcohol and after the air in the autoclave was replaced with nitrogen gas, 20 parts of 10% toluene solution of

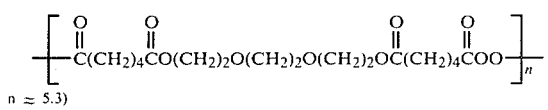

(n ≈ 5.3)

were charged therein, followed by charging 40 parts of vinyl chloride monomer.

The contents of the autoclave were subjected to a polymerization at 58° C. for 4 hours while rotating the autoclave with agitation. The resulting polymers were filtered off and washed with water, followed by dissolving the same into tetrahydrofuran. The obtained solution was poured into a large quantity of methanol, thereby depositing polymers.

The obtained polymers were filtered off and were dried at a reduced pressure, whereby 36 parts of polyvinyl chloride having peroxy bonds in the molecule thereof were obtained.

The average molecular weight thereof was about 30,000 and the number of the peroxy bonds which were introduced in the molecule thereof was 3.6 units (mean value).

It was found from the infrared absorption analysis that the obtained polyvinyl chloride had the characteristic absorption showing the presence of the carbonyl bands of the diacyl peroxy group of peroxy peroxide at 1805 cm$^{-1}$ and 1780 cm$^{-1}$ and the characteristic absorption of the polyvinyl chloride.

Secondly, according to the same procedures as in Example 1 (1) except that tetrahydrofran was used as a solvent in place of benzene, the said polyvinyl chloride was subjected to an alkaline cleavage reaction.

The average molecular weight of the obtained polyvinyl chloride of the final product was about 10,000 and the Iodometry thereabout showed that isolation of iodine therefrom was not recognized. If was found from the infrared absorption analysis that the carbonyl bands of the obtained product at 1805 cm$^{-1}$ and 1780 cm$^{-1}$ were diminished.

From these results, it was recognized that peroxy bonds were introduced into the molecule of the obtained polyvinyl chloride.

EXAMPLE 10-15

[Preparation of polyacrylic ester and polymethacrylic ester having peroxy bonds in the molecule thereof]

In a reactor which was equipped with a thermometer, a stirrer and a reflux condenser, there were charged a monomer, a peroxide of

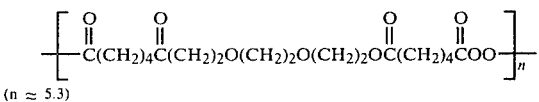

(n ≈ 5.3)

and a solvent respectively in a mixing ratio as shown in Table 4, and the air in the autoclave was replaced with nitrogen gas. The respective batches were subjected to a polymerization under the polymerization conditions as shown in Table 4.

The respective obtained polymerization solutions were poured into a large quantity of methanol, thereby depositing polymers respectively.

Concerning the respective polymers, the average molecular weight thereof was measured according to the viscosity method and number of the peroxy bonds introduced into the molecule thereof was measured by Iodometry. The obtained results are shown in Table 5.

It was found from the infrared absorption analysis that the respectively obtained products have the characteristic absorption showing the presence of carbonyl bands at 1805 cm$^{-1}$ and 1780 cm$^{-1}$ and the characteristic absorption of the polyacrylic ester or polymethacrylic ester.

The respective polymers which were obtained by subjecting the said polyacrylic ester or polymethacrylic ester to an alkaline cleavage reaction according to the same procedures as described in Example 1 (1), was measured about the average molecular weight.

The obtained results show that the respective polymers after the alkaline cleavage reaction decreased to ⅓-1/6, compared with the respective corresponding polymers which had not undergone the alkaline cleavage reaction, in the average molecular weight.

The respective iodometry thereof showed that there were not recognized isolation of iodine. It was found from the infrared absorption analysis that the carbonyl bands at 1805 cm$^{-1}$ and 1780 cm$^{-1}$ were diminished respectively. From these results it was recognized that peroxy bonds were introduced into the molecule of the obtained polymers respectively.

TABLE 4

| | Mixing ratio and polymerization conditions | | | Polymerization Conditions | |
|---|---|---|---|---|---|
| | Mixing ratio (part) | | | Polymerization temperature (°C.) | Polymerization time (hrs) |
| | Monomer | Solvent | Peroxide | | |
| Example 10 | BA 25 | Ethyl acetate 25 | 1.25 | 70 | 4 |
| Example 11 | MMA 25 | Benzene 25 | 1.25 | 60 | 3 |
| Example 12 | 2EHMA 25 | Ethyl acetate 25 | 0.9 | 75 | 2 |
| Example 13 | 2EHMA 25 | Ethyl acetate 25 | 1.25 | 75 | 2 |
| Example 14 | 2EHMA 25 | Ethyl acetate 25 | 2.5 | 75 | 2 |
| Example 15 | SMA 25 | Ethyl acetate 25 | 1.25 | 70 | 3 |

Note:
BA: n-Butyl acrylate
MMa: Methyl methacrylate
2EHMA: 2-Ethylhexyl methacrylate
SMA: Stearyl methacrylate

TABLE 5

| | Polymer | Appearance | Yield (part) | Average molecular weight(× 10⁴) | Number of peroxy bonds (piece) |
|---|---|---|---|---|---|
| Example 10 | Poly n-butyl acrylate | Viscous solid | 23.0 | 20.0 | 19.1 |
| Example 11 | Poly ethyl methacrylate | White powder | 23.0 | 26.0 | 30.9 |
| Example 12 | Poly 2-ethylhexyl methacrylate | White powder | 22.5 | 17.5 | 9.7 |
| Example 13 | Poly 2-ethylhexyl methacrylate | White powder | 23.0 | 10.5 | 8.7 |
| Example 14 | Poly 2-ethylhexyl methacrylate | White powder | 23.5 | 9.5 | 10.5 |
| Example 15 | Poly stearyl methacrylate | White powder | 23.0 | 22.0 | 21.8 |

EXAMPLE 16

[Preparation of styrene-methyl methacrylate copolymer having peroxy bonds in the molecule thereof]

According to the same procedures as described in the foregoing, a mixture of 250 parts of 0.7% aqueous solution of polyvinyl alcohol, and a solution which was obtained by dissolving 8 parts of

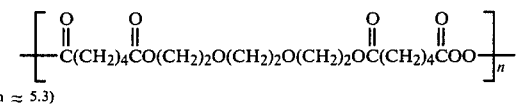

(n ≈ 5.3)

into a mixed solution of 50 parts of styrene monomer and 50 parts of methyl methacrylate, was subjected to polymerization at 70° C. for 3 hours thereby obtaining 98 parts of a copolymer of styrene-methyl methacrylate.

The average molecular weight of the obtained copolymer was about 110,000 and the number of the peroxy bonds in the molecule of the said copolymer was 7.5 (mean value).

It was found from the infrared absorption analysis that the obtained product has the characteristic absorption showing the presence of carbonyl bands at 1805 cm$^{-1}$ and 1780 cm$^{-1}$ and the characteristic absorption of the copolymer of styrene-methyl methacrylate.

The average molecular weight of the cleaved copolymer from the said copolymer was about 40,000. In the iodometry of the cleaved copolymer, there were not recognized isolation of iodine therefrom. It was found from the infrared absorption that the carbonyl bands at 1800 cm$^{-1}$ and 1775 cm$^{-1}$ were diminished.

From these results, it was recognized that in the molecule of the obtained copolymer of styrene/methyl methacrylate, there were introduced peroxy bonds.

EXAMPLE 17

[Preparation of a copolymer of vinyl acetate and n-butyl acrylate having peroxy bonds in the molecule thereof]

According to the same procedures as described in the foregoing, a mixture of 12.5 parts of a vinyl acetate monomer, 12.5 parts of a n-butyl acrylate monomer and a mixed solution consisting of 1.25 parts of

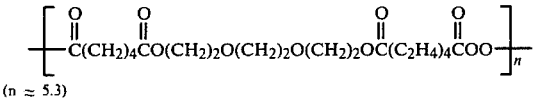

(n ≈ 5.3)

and 25 parts of ethyl acetate was subjected to copolymerization at 60° C. for 3 hours, thereby obtaining 23.5 parts of a copolymer of vinyl acetate/n-butyl acrylate whose average molecular weight was about 250,000 and the number of peroxy bonds which were introduced into the molecule thereof was 28.4 (mean value).

It was found from the infrared analysis that the product has the characteristic absorption showing the presence of carbonyl bands of the diacyl peroxy groups of polymeric peroxide at 1805 cm$^{-1}$ and 1780 cm$^{-1}$ and the characteristic absorption of the copolymer of vinyl acetate and n-butyl acrylate.

According to the same procedures as described in Example 1, (1) except that a petroleum ether was used as a precipitating agent, the said copolymer was subjected to an alkaline cleavage reaction, thereby obtaining a copolymer whose average molecular weight was about 41,000. In the iodometry of the obtained copolymers, there were not recognized isolation of iodine therefrom It was found from the infrared absorption analysis that the carbonyl bands at 1800 cm$^{-1}$ and 1775 cm$^{-1}$ were diminished.

From these results, it was recognized that in the obtained copolymer of vinyl acetate/n-butyl acetate, there were introduced peroxy bonds in the molecule thereof.

EXAMPLE 18

[Preparation of a copolymer of styrene-4-vinyl pyridine]

According to the same procedures as described in the foregoing, a mixture of 250 parts of 0.7 aqueous solution of a polyvinyl alcohol and a mixed solution consisting of 90 parts of styrene monomer and 10 parts of 4-vinyl pyridine were subjected to a polymerization at 75° C. for 3 hours with stirring while replacing the air in the reactor with nitrogen gas, whereby 100 parts of a copolymer of styrene-4-vinyl pyridine were obtained. The average molecular weight of the obtained copolymer was about 52,000 and number of the peroxy bonds in the molecule thereof was 3.4 units (mean value).

It was found from the infrared absorption analysis that the obtained copolymer had the characteristic absorption showing the presence of carbonyl bands of the diacyl peroxy groups of the polymeric peroxide and the characteristic absorption of the copolymer of styrene-4-vinyl pyridine.

The cleaved copolymer which was obtained from the said copolymer had about 28,000 of average molecular weight. In the iodometry thereof, there were not recognized isolation of iodine.

It was found form the infrared absorption analysis of the cleaved copolymer that the carbonyl bands at 1800 cm$^{-1}$ and 1775 cm$^{-1}$ were diminished.

From the above mentioned results, it was recognized that peroxy bonds were introduced into the molecule of the obtained copolymer of styrene-4-vinyl pyridine.

EXAMPLE 19

[Preparation of a copolymer of vinyl acetate and N-vinyl pyrrolidone]

According to the same procedures as described in the foregoing, a batch consisting of 17.5 parts of vinyl acetate monomer, 7.5 parts of N-vinyl pyrrolidone, 1 part of

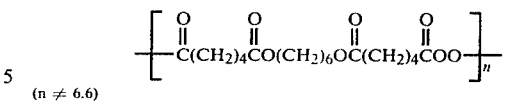

(n ≠ 6.6)

and 25 parts of ethyl acetate was subjected to polymerization at 60° C., for 3 hours, whereby there were obtained 22 parts of a copolymer of vinyl acetate-N-vinyl pyrrolidone having peroxy bonds in the molecule thereof.

The average molecular weight of the copolymer was about 280,000 and number of peroxy bonds in the molecule thereof was 29.2 units (mean value). It was found from the infrared absorption analysis that the said copolymer had the characteristic absorption showing the presence of carbonyl bands of the diacyl peroxy group of polymeric peroxide at 1805 cm$^{-1}$ and 1780 cm$^{-1}$ and the characteristic absorption of the copolymer of vinyl acetate-N-vinyl pyrrolidone.

The cleaved copolymer which was obtained from the said copolymer using a petroleum ether as a precipitating agent, had about 35,000 of average molecular weight.

In the iodometry thereof, there were not recognized isolation of iodine. It was found from the infrared absorption analysis of the cleaved copolymer that the carbonyl bands at 1805 cm$^{-1}$ and 1780 cm$^{-1}$ were diminished.

From the above mentioned results, it was recognized that peroxy bonds were introduced into the molecule of the obtained copolymer of vinyl acetate-N-vinyl pyrrolidone.

EXAMPLE 20

[Preparation of a copolymer of 2—hydroxyethyl methacrylate-methyl methacrylate-ethyl acrylate-acrylic acid having peroxy bonds in the molecule thereof]

According to the same procedures as described in the foregoing, a mixed solution having the following the composition of

| | | |
|---|---|---|
| 2 - Hydroxyethyl methacrylate | 25 | parts |
| Methyl methacrylate | 12.2 | parts |
| Ethyl acrylate | 10 | parts |
| Acrylic acid | 2.5 | parts |
| $\left[\begin{array}{c} \overset{O}{\underset{\|}{C}}(CH_2)_4\overset{O}{\underset{\|}{C}}O(CH_2)_2O(CH_2)_2O\overset{O}{\underset{\|}{C}}OO \end{array}\right]_n$ | 3.5 | parts |
| Isopropyl alcohol | 30 | parts |
| Ethylcellosolve | 20 | parts |

(n ≈ 5.3)

was subjected to polymerization at 75° C. for 3 hours, whereby there were obtained 47.5 parts of a copolymer of 2-hydroxyethyl methacrylate-methyl methacrylate-ethyl acrylate-acrylic acid.

The average molecular weight of the copolymer was about 108,000 and number of the peroxy bonds in the molecule thereof was 14 units (mean value).

It was found from the infrared absorption analysis that the said copolymer had the characteristic absorption showing the presence of the diacyl peroxy groups of the polymeric peroxide at 1805 cm$^{-1}$ and 1780 cm$^{-1}$ and the characteristic absorption of the copolymer of 2-hydroxyethyl methacrylate-methyl methacrylate-ethyl acrylate-acrylic acid.

The cleaved copolymer which was obtained from the said copolymer had about 32,000 of average molecular weight. In the iodometry thereof, there were not recognized isolation of iodine.

It was found from the infrared absorption analysis of the cleaved copolymer that the carbonyl bands at 1805 cm$^{-1}$ and 1780 cm$^{-1}$ were diminished.

From the above-mentioned results, it was recognized that peroxy bonds were introduced into the molecule of the obtained copolymer of 2-hydroxyethyl methacrylate-methyl methacrylate-ethyl acrylate-acrylic acid.

EXAMPLE 21

[Preparation of a copolymer of ethyl methacrylate-acrylonitrile-methyl methacrylate-acrylic acid having peroxy bonds in the molecule thereof]

According to the same procedures as described in the foregoing, a mixture having the following composition of

| | | |
|---|---|---|
| Ethyl methacrylate | 20 | parts |
| Acrylonitrile | 1.5 | parts |
| Methyl methacrylate | 10 | parts |
| Acrylic acid | 5 | parts |
| $\left[\begin{array}{ccc} O & O & O \\ \parallel & \parallel & \parallel \\ -C(CH_2)_4CO(CH_2)_2O(CH_2)_2O(CH_2)_2OCOO \end{array}\right]_n$ | 3.5 | parts |
| Methylethylketone | 25 | parts |
| n - Butyl alcohol | 25 | parts | was subjected to a polymerization at 70° C. for 3 hours, whereby there were obtained 47.5 parts of a copolymer of ethyl methacrylate-acrylonitrile-methyl methacrylate-acrylic acid.

The average molecular weight of the said copolymer was about 108,000 and number of the peroxy bonds in the molecule thereof was 14 units (mean value).

It was found from the infrared absorption analysis that the said copolymer had the characteristic absorption showing the presence of the diacyl peroxy group of the polymeric peroxide at 1805 cm$^{-1}$ and 1780 cm$^{-1}$ and the characteristic absorption of the copolymer of ethyl methacrylate-acrylonitrile-methyl methacrylate-acrylic acid.

The cleaved copolymer which was obtained from the said copolymer had an average molecular weight of about 51,000.

In the iodometry thereof, there were not recognized isolation of iodine. It was found from the infrared analysis of the cleaved copolymer that the carbonyl bands at 1805 cm$^{-1}$ and 1780 cm$^{-1}$ were diminished.

From the above mentioned results, it was recognized that peroxy bonds were introduced into the molecule of the obtained copolymer of ethyl methacrylate-acrylonitrile-methyl methacrylate-acrylic acid.

Reference Example 1

Preparation of a block copolymer of styrene/methyl methacrylate

In a glass reactor which was equipped with a thermometer, a stirrer and a reflux condenser, there were charged 250 parts of 0.7% aqueous solution of polyvinyl alcohol, and subsequently there was charged a mixedsolution of 80 parts of methyl methacrylate and 20 parts of a polystyrene having peroxy bonds in the molecule thereof which was prepared according to the same procedures as in Example 1 (1).

The batch was subjected to a copolymerization at 70° C. for 5 hours with agitation while replacing the air in the reactor with nitrogen gas, whereby 96 parts of a block copolymer of styrene/methyl methacrylate which was in a pearl state, was obtained. (yield: 96%, polymerization conversion rate in relation to the methyl methacrylate: 95%)

Concerning the obtained copolymers, the methyl methacylate homopolymers therein were extracted therefrom with hot acetonitrile for 8 hours using a Soxhlet extractor, followed by extracting therefrom the styrene homopolymers with hot cyclohexane. The resultant residue was regarded as the block copolymer in the obtained product and the block yield thereof was calculated according to the following formula.

$$\text{Block efficiency} = \frac{\text{Amount of block copolymerized methyl methacrylate}}{\text{Amount of methyl methacrylates which were polymerized in the reaction system}} \times 100$$

Consequently, the block efficiency was 87.5%. It was found that the block copolymerization was carried out with a good efficiency.

Reference Example 2

Preparation of a block copolymer of vinyl acetate/methyl methacrylate 15 parts of a mixed solution which was prepared by dissolving 10 parts of polyvinyl acetate having peroxy bonds in the molecule thereof, which was prepared in Example 8(1), into 90 part of methyl methacrylate monomer and 100 oarts of benzene, were charged into 5 of ampules (inside diameter: 20 mm, volume: 50 ml) respectively.

The air in the respective ampules were replaced with nitrogen gas and the said ampules were melted to seal at the upper part thereof. The respective batches were subjected to a copolymerization for 5 hours, by immersing the respective ampules in an oil bath kept at 70° C.

During this time, an ampule was taken out from the oil bath each hour. The contents of the ampule was poured into a large quantity of a petroleum ether, whereby the resultant copolymer was deposited.

The said copolymer was filtered and dried at a reduced pressure. The polymerization conversion ratio in relative to the methyl methacrylate monomer was obtained.

The obtained results are shown in Table 6.

Comparative Example 3

The same procedures were carried out as those described in Reference example 2 except that the polyvinyl acetate which was prepared in Comparative Example 2, was used in place of the polyvinyl acetate which was prepared in Example 8 (1), thereby obtaining the polymerization conversion ratio in relation to the methyl methacrylate monomer used.

The obtained results are shown in Table 6.

TABLE 6

| | Polymerization conversion ratio in relation to methyl methacrylate monomer in block polymerization of vinyl acetate/methyl methacrylate | |
|---|---|---|
| | Polymerization conversion ratio to methyl methacrylate monomer (%) | |
| Polymerization time (hour) | Reference Example 2 | Comparative Example 3 |
| 1 | 13.3 | 4.8 |
| 2 | 38.0 | 15.0 |
| 3 | 62.5 | 26.1 |
| 4 | 86.3 | 38.5 |
| 5 | 97.8 | 50.3 |

It was found from Table 6 that the polyvinyl acetates of the present invention having peroxy bonds in the molecule thereof are more active than the conventional ones and they can produce block copolymers with higher efficiency.

Accordingly it is clear that the copolymers of the invention are very useful industrially.

As decribed in the foregoing, the copolymers having peroxy bonds in the molecule thereof of the present invention have 5–50 units of peroxy bonds per average molecular weight of 100,000 and they have far more units of peroxy bonds per unit average molecular weight than the conventional ones do.

The copolymers having peroxy bonds in the molecule thereof of the present invention may have a broad range of average molecular weight and peroxy bonds.

These facts show that the copolymers having peroxy bonds in the molecule thereof of the present invention are very active in producing block copolymers by polymerizing monomers having double bonds, other than those of the said copolymers, using the same as a polymerization initiator.

Accordingly they can produce block copolymers with high efficiency and the molecular design of the block copolymers can be made in a broad range.

The embodiments of the invention in which an exclusive property or privilege is Claimed are defined as follows:

1. A copolymer having peroxy bonds in the molecule thereof, which copolymer is prepared by copolymerizing a diacyl type polymeric peroxide having the formula

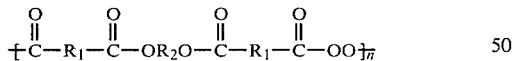

wherein
R$_1$ is alkylene having 1 to 15 carbon atoms or phenylene,
R$_2$ is alkylene having 2 to 10 carbon atoms, —(CHR$_3$,CH$_2$O)$_l$CHR$_3$,CH$_2$ wherein R$_3$, is hydrogen or methyl and l is 1 to 10,

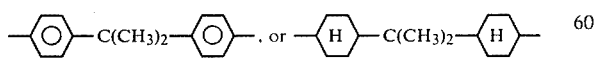

and n is 2 to 10
with one or more monomers having the formula $$CHX_1 = CX_2X_3$$

wherein

X$_1$ is hydrogen,

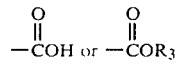

X$_2$ is hydrogen, —CH$_3$, —Cl or —CN,
X$_3$ is —Cl, —CN,

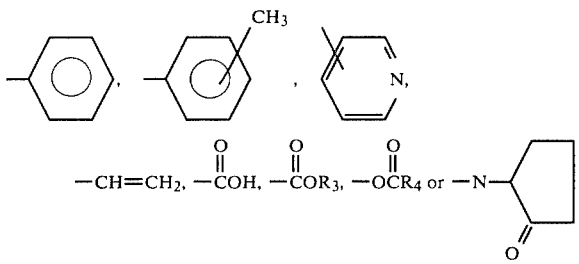

or
X$_1$ and X$_3$ together define

in which R$_3$ and R$_4$ are alkyl having 1 to 18 carbon atoms or substituted alkyl having 1 to 18 carbon atoms with the provisos that
(1) when X$_1$ and X$_2$ are both hydrogen, X$_3$ is

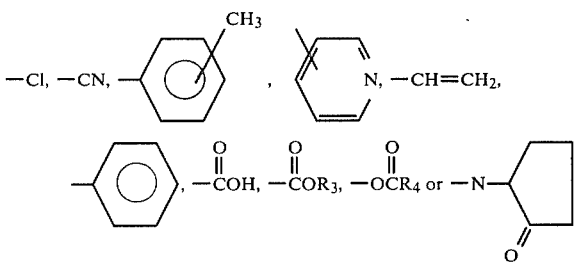

(2) when X$_1$ is hydrogen and X$_2$ is —CH$_3$, X$_3$ is

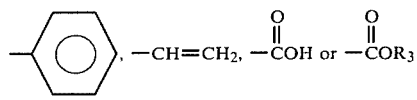

(3) when X$_1$ is hydrogen and X$_2$ is —Cl or —CN, X$_3$ is —Cl, CN or —CH=CH$_2$
(4) when X$_1$ is

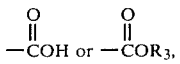

X$_2$ is hydrogen, and X$_3$ is

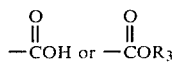

(5) when X$_1$ and X$_3$ together define

$X_2$ is hydrogen,
said copolymer consisting essentially of units of the formula $-CHX_1-CX_2X_3-$ and

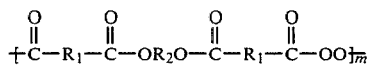

wherein $1 \leq m \leq n-1$.

2. A copolymer as claimed in claim 1 having an average molecular weight of from 5,000 to 1,000,000, and having from 5 to 50 peroxy bonds per each 100,000 of the average molecular weight thereof.

3. A copolymer as claimed in claim 1 or claim 4 wherein said diacyl type polymeric peroxide is selected from the group consisting of

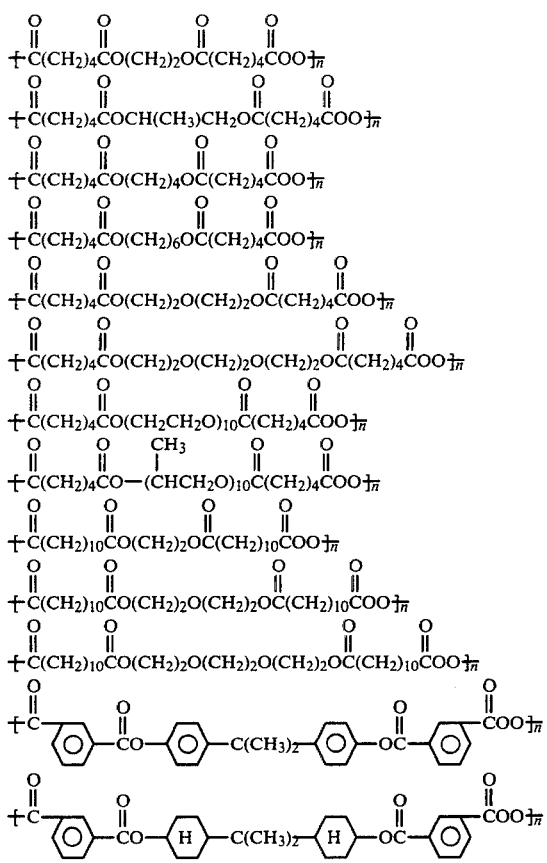

4. A copolymer as claimed in claim 3 in which said monomers are selected from the group consisting of styrene, vinyl chloride, vinylidene chloride, acrylonitrile, vinylidene cyanide, vinyl acetate, vinyl butyrate, vinyl stearate, vinyl toluene, vinyl pyridine, vinyl pyrolidone, acrylic acid, methacrylic acid, methyl acrylate, ethyl acrylate, butyl acrylate, 2-ethylhexyl acrylate, lauryl acrylate, stearyl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hyroxypropyl methacrylate, glycidyl methacrylate, maleic anhydride, maleic acid, maleic acid esters, fumaric acid, fumaric acid esters, butadiene, isoprene and chloroisoprene.

5. A copolymer as claimed in claim 4 in which the amount of said diacyl type polymeric peroxide is from 0.5 to 10 parts by weight, per 100 parts by weight of said monomer.

6. A process for preparing a copolymer having peroxy bonds in the molecule thereof which comprises copolymerizing a diacyl type polymeric peroxide having the formula

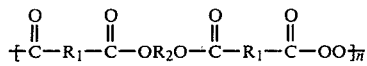

wherein
$R_1$ is alkylene having 1 to 15 carbon atoms or phenylene,
$R_2$ is alkylene having 2 to 10 carbon atoms, $-(CHR_3,CH_2O)_lCHR_3,CH_2$ wherein $R_3$, is hydrogen or methyl and $l$ is 1 to 10,

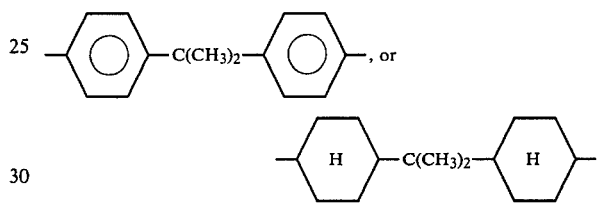

and n is 2 to 10
with one or more monomers having the formula $CHX_1=CX_2X_3$ wherein
$X_1$ is hydrogen,

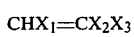

$X_2$ is hydrogen, $-CH_3$, $-Cl$ or $-CN$
$X_3$ is $-Cl$, $-CN$,

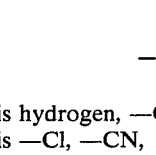

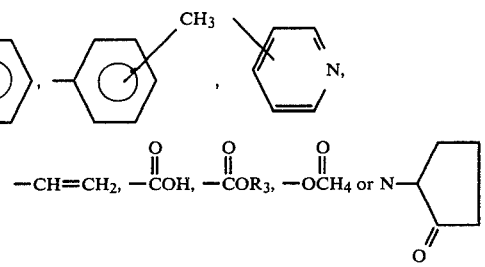

or
$X_1$ and $X_3$ together define

in which $R_3$ and $R_4$ are alkyl having 1 to 18 carbon atoms or substituted alkyl having 1 to 18 carbon atoms with the provisos that (1) when $X_1$ and $X_2$ are both hydrogen, $X_3$ is —Cl, —CN,

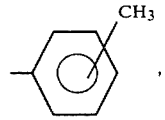 , 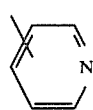 ,

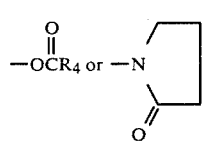 , —CH=CH$_2$,

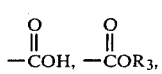 ,

—OCR$_4$ or —N<span>(pyrrolidinone)</span>

(2) when $X_1$ is hydrogen and $X_2$ is —CH$_3$, $X_3$ is

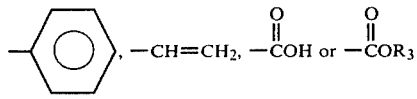

(3) when $X_1$ is hydrogen and $X_2$ is —Cl or —CN, $X_3$ is —Cl, CN or —CH=CH$_2$ (4) when $X_1$ is

$X_2$ is hydrogen, and $X_3$ is

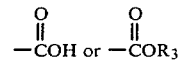

(5) when $X_1$ and $X_3$ together define

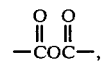 , $X_2$ is hydrogen,
said copolymer consisting essentially of units of the formula —CHX$_1$—CX$_2$X$_3$— and

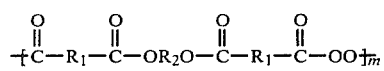

wherein $1 \leq m \leq n-1$.

* * * * *

UNITED STATES PATENT AND TRADEMARK OFFICE
CERTIFICATE OF CORRECTION

PATENT NO. : 4 283 512
DATED : August 11, 1981
INVENTOR(S) : Masaru Matsushima, Takeshi Komai and Masaharu Nakayama It is certified that error appears in the above—identified patent and that said Letters Patent is hereby corrected as shown below:

Col. 25, line 18; change "claim 4" to ---claim 2---.

Col. 26, in the portion of the formula appearing at line 55;

change "$\underset{-OCH_4}{\overset{O}{\|}}$" to --- $\underset{-OCR_4}{\overset{O}{\|}}$ ---.

Col. 28, line 13; the formula should read as follows:

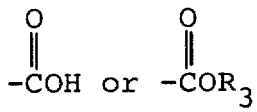

Signed and Sealed this

Fifteenth Day of December 1981

|SEAL|

Attest:

Attesting Officer

GERALD J. MOSSINGHOFF

Commissioner of Patents and Trademarks